(12) United States Patent
Fischer

(10) Patent No.: US 6,865,678 B2
(45) Date of Patent: *Mar. 8, 2005

(54) PERSONAL DATE/TIME NOTARY DEVICE

(76) Inventor: Addison M. Fischer, 60 14th Ave. South, Naples, FL (US) 33942

( * ) Notice: Subject to any disclaimer, the term of this patent is extended or adjusted under 35 U.S.C. 154(b) by 0 days.

This patent is subject to a terminal disclaimer.

(21) Appl. No.: 10/140,374

(22) Filed: May 8, 2002

(65) Prior Publication Data

US 2003/0041246 A1 Feb. 27, 2003

Related U.S. Application Data

(60) Continuation of application No. 09/363,744, filed on Jul. 30, 1999, now Pat. No. 6,408,388, which is a continuation of application No. 08/459,524, filed on Jul. 2, 1995, now Pat. No. 5,936,149, which is a division of application No. 08/056,547, filed on May 5, 1993, now Pat. No. 5,422,953.

(51) Int. Cl.[7] .............................................. H04L 9/00
(52) U.S. Cl. ..................... 713/176; 713/159; 713/172; 713/178; 713/200; 713/202; 380/259; 705/65; 705/73; 705/75; 705/76
(58) Field of Search ............................ 713/159, 172, 713/176, 178, 200, 202; 380/259; 705/65, 73, 75, 76

(56) References Cited

U.S. PATENT DOCUMENTS

| | | | |
|---|---|---|---|
| 4,290,130 A | 9/1981 | Lowdenslager et al. | .... 368/200 |
| 4,456,386 A | 6/1984 | Dellea | ......................... 368/201 |
| 4,799,258 A | 1/1989 | Davies | ......................... 380/21 |

(List continued on next page.)

FOREIGN PATENT DOCUMENTS

| | | |
|---|---|---|
| EP | 0 422 757 | 5/1990 |
| EP | 0 427 515 | 5/1991 |
| JP | 61-724363 | 4/1986 |
| WO | WO 92/12485 | 7/1992 |

OTHER PUBLICATIONS

Smart Card 2000: The Future of IC Cards, D Chaum & I. Schaumuller–Cichl, pp. 139–146, Laxwnburg, Austria, Oct. 19–20, 1987.

Jahrbuch Der Deutschen Gesellschaft Fur Chronometrie, vol. 25, No. 2, Feb. 1974, Stuttgart De, pp. C12–1 C12–9, Burth 'Die Rationelle Ermittlung Des Optimalen Abgleiches Bei Quarzuhren Mit Der Integrierten Schaltung Saj 310', p. C6, line 1—p. C7, line 9; Figure 3.

Akl, "Digital Signatures: A Tutorial Survey", *Computer*, vol. 16, No. 2, pp. 15–24, Feb. 1983.

(List continued on next page.)

*Primary Examiner*—Gregory Morse
*Assistant Examiner*—Paul Callahan
(74) *Attorney, Agent, or Firm*—Nixon & Vanderhye P.C.

(57) ABSTRACT

A personal data/time notary device is embodied in a token device such as a "smart card". The portable notary device includes an input/output (I/O) port, which is coupled to a single integrated circuit chip. The I/O port may be coupled to a conventional smart card reading device which in turn is coupled to a PC, lap-top computer or the like. A tamper resistant secret private key storage is embodied on the chip. The private key storage is coupled to the processor which, in turn, is coupled to a permanent memory that stores the program executed by the processor. At least one clock is embodied on the card. A second clock 14 and a random value generator 10 are also preferably coupled to the processor. The device combines digital time notarization into a digital signature operation to ensure that a time stamp is always automatically present. The user does not need to be involved in any additional decision making as to whether time stamping is necessary.

7 Claims, 5 Drawing Sheets

U.S. PATENT DOCUMENTS

| | | | |
|---|---|---|---|
| 4,837,822 A | 6/1989 | Crosley et al. | 380/23 |
| 4,974,193 A | 11/1990 | Beutelspacher et al. | 364/900 |
| 5,001,752 A | 3/1991 | Fischer | 380/23 |
| 5,022,080 A | 6/1991 | Durst et al. | 380/23 |
| 5,136,643 A | 8/1992 | Fischer | 380/23 |
| 5,136,646 A | 8/1992 | Haber et al. | 380/49 |
| 5,136,647 A | 8/1992 | Haber et al. | 380/49 |
| 5,189,700 A | 2/1993 | Blandford | 380/23 |
| 5,887,065 A | 3/1999 | Audebert | 380/23 |

OTHER PUBLICATIONS

Davies et al., *Security for Computer Networks*, pp. 275–277 and 287, 1984.

Denning, *Crptography and Data Security*, p. 165, 1982.

Simmons, "Introduction", *Secure Communications and Asymmetric Cryptosystems*, pp. 1–8, (Gustavus J. Simmons, ed., 1982).

Williams, "Computationally "Hard" Problems as a Source for Cryptosystems", *Secure Communications and Asymmetric Cryptosystems*, pp. 11–39, (Gustavus J. Simmons, ed., 1982).

Diffie, "Conventional Versus Public Key Crptosystems", *Secure Communications and Asymmetric Cryptosystems*, pp. 41–72, (Gustavus J. Simmons, ed., 1982).

Merkle, "Protocols for Public Key Cryptosystems", *Secure Communications and Asymmetric Cryptosystems*, pp. 73–104, (Gustavus J. Simmons, ed., 1982).

Popek et al., "Encrypton and Secure Computer Networks", *Computing Surveys*, vol. 11, No. 4, Dec. 1979, pp. 331–356.

Denning et al., "Timestamps in Key Distribution Protocols", *Communications of the ACM*, Aug., vol. 24, No. 8, 1981, pp. 533–536.

Merkle, "Protocols for Public Key Cryptosystems", *IEEE Computer Society, Proceedings of the 1980 Symposium on Security and Privacy*, Apr. 14–16, 1980, Oakland, CA., pp. 122–134.

Denning, "Protecting Public Keys and Signature Keys", Computer, vol. 16, No. 2, Feb. 1983, pp. 27–35.

Rihaczek et al., "Tele Trust: Smart Card Access to Servers", *Smart Card 2000: The Future of IC Cards*, pp. 139–146, (David Chaum and Ingrid Schaumüller–Bichl, eds.) (1987).

Caelli, "Privacy and Security in Office Automation Systems", *The Australian Computer Journal*, vol. 17, No. 3, Aug. 1985, pp. 126–130.

Diffie et al., New Directions in Cryptography, *IEEE Transactions on Information Theory*, vol. IT22, No. 6, pp. 644–654, Nov. 1976.

PERSONAL DATE/TIME NOTARY DEVICE

This is a continuation of application Ser. No. 09/363,744 filed Jul. 30, 1999, now U.S. Pat. No. 6,408,388, which is a continuation of Ser. No. 08/459,524, filed Jul. 2, 1995, now U.S. Pat. No. 5,936,149, which is a divisional of application Ser. No. 08/056,547, filed May 5, 1993, now U.S. Pat. No. 5,422,953, the entire contents of which is hereby incorporated by reference in this application.

BACKGROUND AND SUMMARY OF THE INVENTION

Since the advent of digital signatures, the potential exists for more transactions to be accomplished electronically. Using digital signatures, it is possible to undeniably determine that the party performing the signature operation is properly authorized to do so.

Digital signatures having a "historic" value, such as those associated with an electronic contract are becoming increasingly common. In such an electronic contract, it may be important to be able to prove when a particular digital signature was performed (e.g., before or after the time of a possible public key revocation). With many electronic documents, such as contracts, journals, etc., signatures of historical significance become part of archived records. Without being able to confirm exactly when such signature was performed, revocation of a public key as of a particular point in time may cast doubt on any future verification of signatures which may have been performed months or years ago.

Accordingly, it is useful to know with certainty the date and time of a digital signature, particularly in the context of electronically maintained diaries, inventor's scientific logs, journals, electronic bids, contracts or the like. It is also useful to convincingly demonstrate to a third party the signature time and signature ownership.

One way to solve this problem is to "notarize" all signatures having possible historic importance such as, for example, by using the applicant's time/date notary facility such as is described in U.S. Pat. Nos. 5,001,752 and 5,163,643, which patents are incorporated herein by reference. These patents describe an effective manner for performing such notarization using a secure device embodying a trusted clock to countersign important digital signatures by signing them in conjunction with the notarization time taken from the device's trusted time source.

To effectively use known digital notaries requires that someone recognize in advance that the signature will have historic importance and remember to apply a time notarization to the digital signature. The user also must route the signed material (or some hash thereof) through the time notary device. Thus, the user must have access to the trusted time notary facility some time soon after the creation of the digital signature.

Practically speaking the digital notary device may not be available at the time the digital signature is constructed. The signer may fail to remember to have his or her signature notarized in a timely fashion. This is particularly likely to occur when digital signatures are made with portable devices such as a lap-top computer, where the user is often away from his or her normal place of business. With some material, it may not be clear at the time of signing, that a notarized time stamp is important.

The present invention advantageously combines digital time notarization into a digital signature operation to ensure that a time stamp is always automatically present. The user does not need to be involved in any additional decision making as to whether time stamping is necessary. By eliminating the need for a separate time stamp notarization device, the user saves time, money and effort.

The present invention is embodied in a token device, e.g., such as a Smart Card, Smart Disk, or a MCIA device so that it is more readily available than a separate time stamp notarization device and easier to use with portable devices such as laptop computers. The method and apparatus described herein advantageously allow an automatic trusted time stamp to be incorporated into user's digital signature operation so that no additional user steps are necessary. The applicant's smart card/token type media can be used to simultaneously perform a time stamp notarization as part of a digital signature at a user's home in association with the user's personal computer (PC) or away from home in conjunction with a portable device such as a lap-top computer. By simultaneously obtaining a time stamp notarization as part of the digital signature, any verifier not only may prove that the signature was performed by the user, but also may prove when the signature took place.

The present invention contemplates various alternative embodiments or modes of implementation via which the trusted time stamp is incorporated into, or associated with, the user's signature. Digital certificates usually accompany digital signatures to attest to the identity and the attributes of the entity associated with a private/public key. In accordance with an embodiment of the present invention, the factory certifies the public key associated with the personal date/notary device of the present invention. The same key may also be certified as belonging to the owner/operator of the token device. Alternatively, the device may contain a second key for the user which is separately certified with the user's identity. Implementations are also contemplated where the certificates are maintained externally to the device (e.g., in storage associated with a computer driving the notary device) or internally so that they can be emitted, if desired, as part of the signing operation.

The present invention advantageously permits every digital signature to be time stamped in a trusted way so the user no longer must decide whether the material is important enough to time stamp. Since every signature generated by a notary device in accordance with the present invention can be accurately placed in time, it become relatively simple to automatically determine the validity of a user, even if the user's smart card is lost or stolen or even if the authority of the user is eventually revoked. At any future time, it can readily be determined when a digital signature with a trusted time stamp was performed.

BRIEF DESCRIPTION OF THE DRAWINGS

Further features and advantages of the present invention will become apparent upon consideration of the following detailed description of the invention in conjunction with the following drawings of which.

DETAILED DESCRIPTION OF THE DRAWINGS

Figure 1:
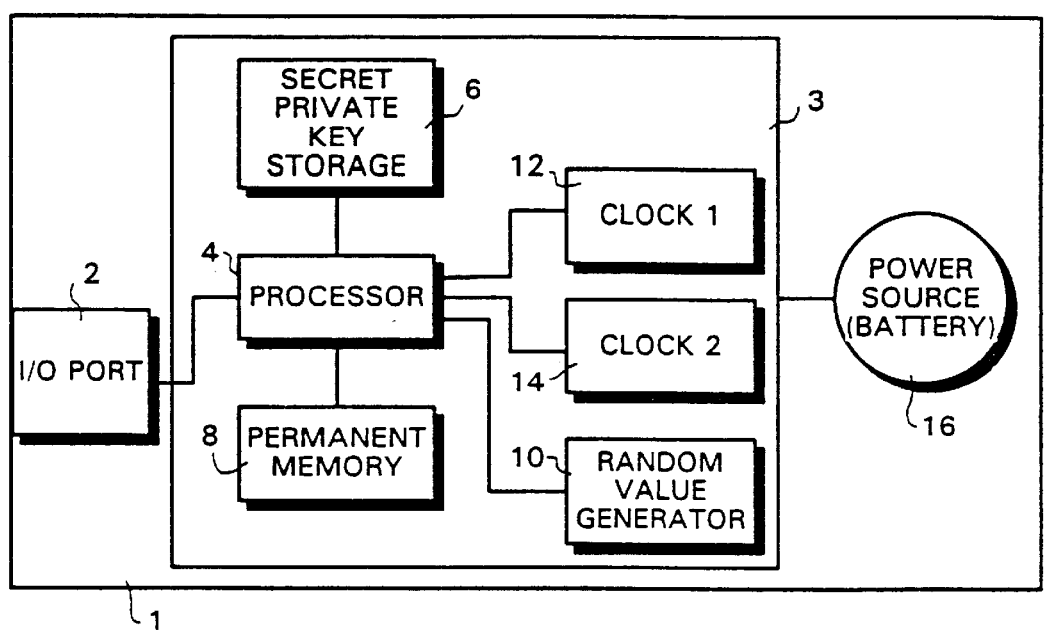
FIG. 1 is a block diagram of an exemplary embodiment of the personal date/time notary device of the present invention.

FIG. 1 is a block diagram of a personal date/time notary device in accordance with an exemplary embodiment of the present invention. The device is preferably embodied in a token device such as a "smart card" 1. Alternatively, the notary device 1 may be embodied on a MCIA card which is thicker than a conventional smart card and typically includes at least several megabytes of storage. The media 1 may alternatively be a "smart" diskette or virtually any kind of personal token device that can be carried or worn by a user. If embodied in an item worn, such a token device may include a security feature causing the device to be deactivated upon sensing removal from the user. Reactivation would require entry of a password. Such a token device may be embodied in an integrated circuit mounted in a wristwatch or a ring worn by a user or other jewelry or traditional personal items (cuff links, tie clasp, earrings, etc.).

The portable notary device 1 includes an input/output (I/O) port 2, which is coupled to an integrated circuit, preferably, a single chip 3. I/O port 2 may be coupled to a conventional smart card reading device (not shown) which in turn is coupled to a PC, lap-top computer or the like.

A tamper resistant secret private key storage 6 is embodied on chip 3. Attempts to penetrate the device 1 may, for example, trigger processor 4 to overwrite the secret key. The secret private key storage 6 may, for example, be a secure RAM or a write-once memory. The secret private key storage 6 stores at least the private key associated with the user who has custody of (or owns) the smart card 1.

In accordance with one exemplary embodiment of the present invention, the same user's private key may also be associated with the digital time notary function. Alternatively, a separate private key may be used for the notary function.

The private key storage 6 is coupled to processor 4 which, in turn, is coupled to a permanent memory 8 that stores the program executed by processor 4. Processor 4 may be any one of a variety of commercially available microprocessors. Processor 4 may, for example, be a Motorola 6805. The particular processor should be chosen depends on practical considerations familiar to those skilled in the art, such as cost and the processing power needed to implement the algorithm used to perform the digital signature operation. In the present invention, the RSA algorithm, which is described in Rivest et al U.S. Pat. No. 4,405,829 or the DSS (Digital Signature Standard) is preferred. It is, however, contemplated that algorithms other than RSA or DSS may be used in which case a processor with more or less computing power than the Motorola 6805 may be useful or sufficient.

At least one clock 12 is embodied on card 1. In the presently preferred embodiment a second clock 14 and a random value generator 10 are also coupled to processor 4. Clock 14 is utilized to enhance the accuracy of the time notary device 1 such that the actual clock value is taken as the average of the values generated by clocks 12 and 14. The two clocks may be used to mutually check each other to insure neither becomes erratic.

Random value generator 10 may, for example, be a well-known noise generating diode-based device. Any other random value generator may be used which takes advantage of the inherent randomness of an associated physical device to maximize the randomness of the value used by processor 4 in the digital signature process. Alternatively, random value generator 10 may be replaced by instructions stored in permanent memory 8 for generating a pseudo-random number via well-known software techniques. Each of the above-described components embodied on integrated circuit chip 3 are powered by a suitable long life battery 16, although in some embodiments, it may be useful to leave some components unpowered except during operation.

Although the personal date/time notary device of the present invention is preferably used to provide a time notarization for each signature, if desired, no such time notarization necessarily need be provided. Additionally, processor 4 may be programmed to performed general purpose "smart" card related transactions well known to those skilled in the art.

Figure 2:
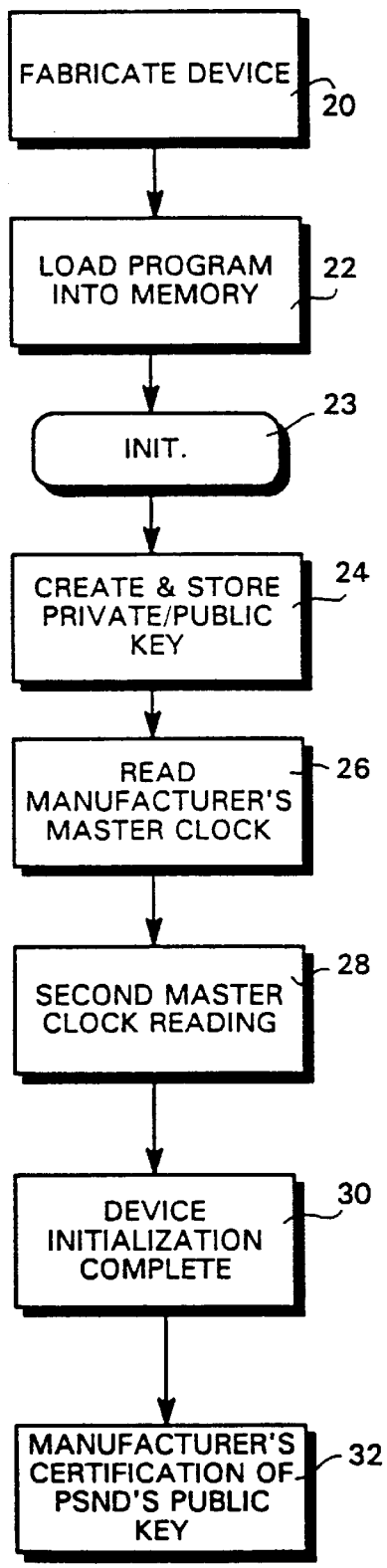
FIG. 2 is a flow diagram depicting the manner in which a personal date/time notary device is initialized by the manufacturer.

Turning next to FIG. 2, the manner in which a manufacturer initializes a personal notary device is described. After fabricating the device 1 using conventional techniques (20), the program ROM 8 is loaded with the software which is to be executed by processor 4 (22). Thereafter, initialization operations (23) begin.

As indicated in block 24, a private/public key pair is created and stored. This operation takes place after the battery 16 is installed into the notary device 1. Preferably the device 2 generates its own private key so that it never exists outside the confines of the secure notary device environment. It is possible, however, that the private key could be generated externally and loaded into the device 1 but internal generation is preferable for security reasons. Preferably, a private/public key pair is created using the RSA algorithm as described in the above-identified U.S. Pat. No. 4,405,829. However, other algorithms may be used for creating a public/private key pair.

A public key is output through I/O port 2 at some point in time although it need not be done during the initial key loading process. Preferably, the public key is not output until both notary device clocks 12 and 14 are set. If this precaution is taken, the device 1 must be completely initialized before it is possible to do any digital signatures. As part of the initialization process shown in block 26, the notary device 2 accepts the current date/time from a master clock having a high degree of accuracy. In accordance with the preferred embodiment of the present invention, clocks 12 and 14 are both embodied in the device 1 to reduce the possibility of error or deliberate tampering attempts. It is contemplated that the manufacturer's master clock is set in accordance with Greenwich mean time, which is recognized throughout the world. The output of the manufacturer's master clock is coupled through I/O port 2 to processor 4 and then to clock 12 and 14. Using two clocks permits the processor to determine whether the clock 12 is functioning properly since the processor 4 monitors the difference in time between the output of clocks 12 and 14.

As indicated at step 28, in the presently preferred embodiment after a period of time such as a day or week, the notary device 1 is resynchronized with the same master clock (or another accurate clock) and the "clock drift" unique to this hardware is determined. This adjustment factor is then retained in the device's permanent memory. A calibrated clock reading may be determined by taking a first clock reading from the master clock, storing the first clock reading, taking a second clock reading from the master clock, storing the second clock reading, and counting the number of oscillations between the master clock readings. Then the actual oscillation frequency may be calculated by using the oscillation count divided by the difference between the second and first master clock readings to compute oscillations per unit time, storing this calculated oscillation frequency and adjusting the output of the on-chip clock device in accordance with the calculated oscillation frequency. The current time after calibration may be computed by the steps of: counting the number of oscillations since the first clock reading (a benchmark time), dividing this value by the calibration value, adding the result to the said first clock reading. Assuming the uncertainty of the master clock reading is large compared with the oscillation period, this gives a clock accuracy of roughly no greater than twice the uncertainty of the master clock reading divided by the difference of the two master clock readings. Thus, an uncertainty of 0.25 seconds in reading the master clock, where readings are separated by a week, would give a calibration-corrected accuracy of better than 1/million. In this manner, compensation may be made for any individual deviations that exist as a result of manufacturing variations.

Since many digital clocks are known to vary slightly based on temperature, if dual clocks are used, it is possible to fabricate them in different ways, possibly from somewhat different materials, or different geometries, so that temperature variations will affect the clocks in different ways, each of which is understood and known (e.g., different coefficients of drift). Although such drift is slight, it could be used as a second-order correction to detect and account for on-going clock drift due to temperature variations. Once both clocks were calibrated, for example, at a known controlled temperature, any mutual deviation, which although presumably would be slight, could be used to, in effect, gauge the temperature and provide for internal correction. This same approach could, of course, be used in any digital clock device in which clocks drifted in some understood way based on external influences.

As indicated in FIG. 2 step 30, at the point the device initialization is deemed complete. Once loaded, the program is designed such that as soon as the secret key is available, no further data or programs can be loaded unless all memory (including the secret key storage) is erased. The clock loading process is only allowed to occur once.

It is contemplated that any loss of power, which would cause the clock to become invalid, would also be designed to render the device inoperative—so that the device will not produce spurious time readings.

As indicated at step 32, the public key associated with the private key secretly stored in the notary device is certified by the manufacturer as belonging to a trusted notary device. It may be desirable to further test the device for correctness and durability before the factory certification is generated. The manufacturer generates a certificate to indicate that the generated public key is authorized for use with this particular user's notary device. This manufacturer's certificate is thereafter associated with the card 1.

In accordance with the presently preferred embodiment, after the program executed by processor 4 is loaded into ROM 8, the program is executed to either itself perform steps 24–32 or assist in the performance of these steps by at least prompting connection to a manufacturer's master clock (as is required, for example, in steps 26 and 28).

The notary device of FIG. 1 is designed to be implemented in accordance with various alternative embodiments or modes of operation. A first mode of operation, uses a single private key. In this mode, there is a single resulting digital signature and a single certificate. The certificate establishes that a particular user is operating with a private key in a trusted notary device. In this implementation, the certifier explicitly indicates in the user's certificate that the user's private key is embodied in a secure device with a trusted clock. This might also be accomplished indirectly if the certifier was known (either explicitly or implicitly) to only certify users whose private key is operated within secured devices with trusted clocks.

There are several ways in which the certification authority could ensure that the public key is matched with the private key in the secure time device. For example, a certificate issued by the device manufacturer associating the public key with the trusted device may be utilized. In effect, the user's certifier vouches that the device contains the user's private key and also provides trusted time so that only the single certificate is required. The advantage of this embodiment is that each public key may be accompanied by only one immediate certificate. In contrast, the other embodiments require two immediate certificates—one by the identifying certification authority binding the individual and one from the manufacturer demonstrating a secure clock device.

If this first embodiment is utilized, there are some additional steps required by the certifier or the user, beyond those that may normally be taken to simply confirm that the public key is associated with the user. The additional steps confirm that the user's public key is indeed also associated with a trusted date/time notary device.

In order to certify the user, initially a validation step is performed in which a validating certificate provided by the manufacturing device indicates that the subject public key is properly associated with the notary device in question. That the user's public key is properly associated with the notary device may be confirmed by issuing a challenge with the expectation of getting a predetermined response to confirm that the subject key is properly associated with the notary device. The notary device may be operated in the certifier's presence against random challenge data supplied by the certifier so that the certifier is assured that the actual device produces an expected signature (as verified with the anticipated public key). The certifier also checks that the date/time produced by the device is correct.

After verification, the certifier constructs a certificate for the device's public key which indicates that the public key reflects that the designated user operates through a trusted notary device. Such an indication may be indicated explicitly in a certificate or implicitly, e.g., by virtue that the certifier is known only to certify user's who operate their private keys from trusted notary devices.

The present invention may also be operated in accordance with a second embodiment which is similar to the first embodiment, except that two certificates are generated for the same public key. One set of certifications comes from the "factory" confirming that the associated private key resides in the trusted notary device; the second from a certification authority confirming the association between the user and the public key.

In the second embodiment, like the first, the device contains a single private key associated with the user. This private key is certified by the device manufacturer as operating within a secure notary device environment. The private key is also certified by an identifying authority confirming association between the notary device's private key and the individual who operates it.

Operation of the device results in the creation of a structure that includes the data to be signed (an electronic document) or some derivation of it (such as its hash); and the current time as determined by the device from its internal trusted clock. The private key is then used to digitally sign this aggregate structure (or some hash thereof).

Subsequently, this signature can be verified by any entity having the public key corresponding to the secret private key stored within the device 1. In addition, by keeping the two certificates associated with the key—the manufacturer's and the user's key—the verifying entity can determine that the signing key is associated with the particular user and also that the supplied time stamp is trustworthy.

Steps which may be taken by a verifier to confirm that the signature and a time stamp are valid may include 1) insuring that the signature was correctly formed based on the signature value, the associated public key and the format expected for an embedded time stamp; 2) insuring that the certificate information of the user is valid and traces back to some root certificate which the verifier trusts (to thereby verify the identity of the user); and 3) insuring that the certificate information provided by the manufacturer of the notary device indicates that the device incorporates a trusted clock value into its signatures and that the verifier trusts the manufacturer to certify devices incorporating trusted time clocks.

Figure 3:
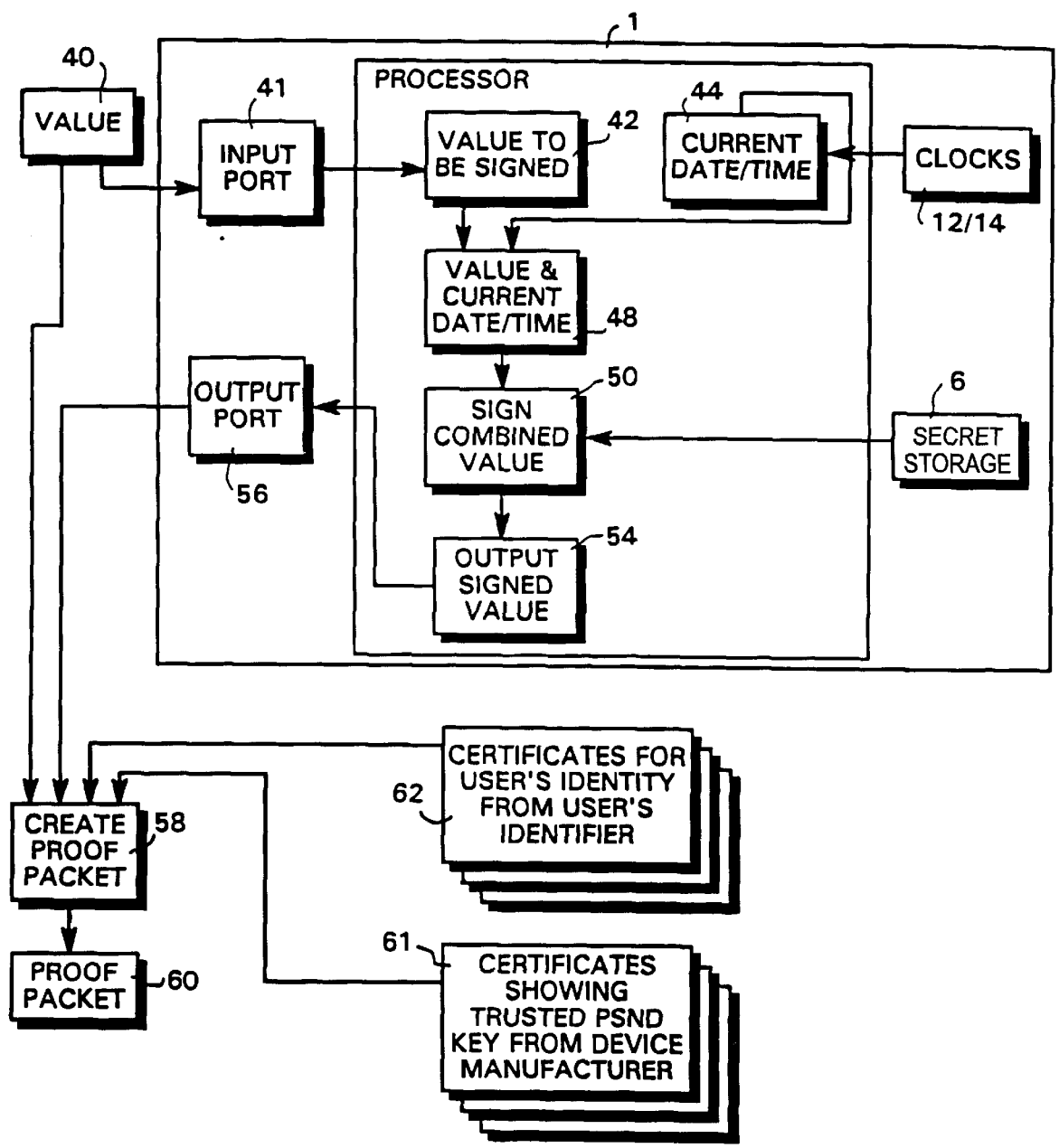
FIG. 3 is a data flow/logic diagram showing how a notary device may be operated in accordance with first and second exemplary embodiments of the present invention.

FIG. 3 is a flow/block diagram which exemplifies operation in accordance with the above-described first or second embodiments of the present invention. As shown in FIG. 3, a digital value/document 40 to be signed is input to the card 1 via input port 41 through a smart card interface device (not shown). Value 40 is coupled to processor 4, where the value is temporarily stored as indicated at step 42.

Processor 4 then extracts the current date and time from the on-board trusted clocks (12, 14) and stores this data as indicated at block 44. The digital value/document 40 to be signed (or some derivative thereof, such as its hash) is combined in an unambiguous manner with the current date and time as shown in step 48. In step 50, the combined value is signed with the secret private key stored in storage device 6 in accordance with known public key crypto methodology. If desired, prior to performing the digital signature operation processor device 4 may be programmed to first validate the user's personal identification password (PIN).

In accordance with the first and second exemplary embodiments, the notary device 1 uses a single private key stored in its private key storage 6. The resulting signed value is transmitted in step 54 to output port 56 which is part of I/O port 2 shown in FIG. 1. The digital value which is coupled to output port 56 is a digital signature which embodies the date/time indicia extracted from the trusted clocks 12 and 14.

Through a smart card interface device (not shown), the output value from output port 56 is preferably coupled to an external processor such as a personal computer or lap-top computer (58). As indicated in steps 62 and 64, any certificates which may be required are coupled to create a proof packet 60. The proof packet 60 established the identity of the public key with respect to the operator/owner of the personal signature notary device and establishes that the public key is incorporated into a notary device which constructs notarized personal signatures with a trusted date.

These certificates, the output value from output port 56, and the original digital document, form the signature proof packet 60 generated by these exemplary embodiments of the present invention. The certificate-based data, the output of notary device 1, and the digital document 40 may be combined in accordance with known public key-crypto standards for appending ancillary material to a digital signature. The proof packet 60 may be stored in the user's computer system (58) and may be indexed in any of a variety of ways. For example, the signed value may represent the current day's entry in an inventor's journal and may be indexed as a file associated with the inventor's journal. If the notary device 1 had sufficient storage capacity, it would be possible to use processor 4 embodied within the card to generate the proof packet and store the packet in the associated memory. However, since the operations performed in generating the proof packet 60 do not require a high level of security, these operations may take place outside card 1 with the user's computer.

In accordance with third and fourth embodiments of the present invention, the private key storage device stores two private keys and generates two different signatures. The first private key is the private key associated with the notary device, and the second private key is associated with a particular user. The notary device private key is generated at the factory as described above (generally by the device itself) when the clock was initially calibrated certifying that the public key belongs to a secure clock device. The user's private key is also preferably generated by the device itself and is certified as belonging to the user who operates or owns the notary device.

In this embodiment, operation consists of the device producing two digital signatures, one with the user's private key and another with the device's own private key associated with the time stamp. Although the time and order of signature creation could be done several ways, it is preferred that a hash of the data being signed be combined with the current value of the secure clock and that this combined result be signed with the user's private key. Then this signature is signed with the device's private key. Alternatively other signing sequences may be utilized. For example, the subject material may be signed with the user's private key, then the result may be signed with the device's notarization key. In this case, the final result would appear similar to the result of using a separate notary device to time stamp the user's signature. This approach would be compatible with more conventional notarization techniques. Verification is done when operating in conjunction with this third embodiment by verifying both signatures (that of the user's public key and the notary's public key) and checking the respective certificates to ensure they are valid and trusted.

The third mode of operation is similar to the first mode except that the initialization process differs. Turning back to FIG. 2, when operating in accordance with the third embodiment, an additional initialization step must be performed such that a second private signature key is generated and stored in the device's secret secure memory 6. Accordingly, the notary device contains two private signature keys stored in memory 6 such that the first key is generated while the notary device is being manufactured (ideally within the notary device itself) The second key may be generated at a later time and is associated with the user. Actually, several different user keys could be generated and maintained with the device. Depending on the application, it may be desirable to allow multiple keys to exist in parallel, or one at a time.

In accordance with a fourth embodiment of the present invention, the notary device preferably is embodied in a smart diskette constructed in accordance with German published patent application P4112023.9, which is incorporated herein by reference. The device operates as an interface between a wallet-sized smart card and the diskette reader of a PC. In this embodiment, the notary device operates as a secure interface with which a smart card (or any other conventional digital signature device) interacts to achieve time notarization as part of a unified request.

The notary device in this fourth embodiment does not contain the user's private key, but is only an interface (or "reader") which couples a smart card device to a computer (or other resource) which presents data to be signed. The device acts to combine a time notary device with a smart card device that performs the user's private key operations (where the smart card does not have a trusted clock). In this case, one can view the time notary device as being coupled to a smart card reader.

In this embodiment, the device operates such that the data to be signed and time stamped is presented to the notary device. The device interfaces with the user's smart card which operates the user's private card and returns a resulting signature. The resulting signature, which is returned to the device from the smart card (or some value derived from the signature) is digitally signed by the device with its own private (notarization) key. The resulting combined signature is then returned to the caller of the device. In this case, the result appears similar to that produced with the previously described embodiment above (where two signatures and two certificates are used). In accordance with this interface-based embodiment, a time notarization device also acts as a smart card reader which allows the effective "simultaneous" performance of time stamped user digital signatures. This embodiment, in effect, is a smart card reader which includes a time notarization device that produces a time notarized digital signature to a host PC or other hardware device.

In accordance with the third embodiment, the operations depicted in FIG. 3 must be modified such that the operations of block 42 actually produce a digital signature by the user's private key of the material to be signed. The output value from box 42 then becomes "value to be notarized" 42.

Similarly, the initialization process of FIG. 2 must be augmented to show that a second public/private key pair is generated which exclusively represents the user. However, this can be generated after the device leaves the factory—and could be generated on user demand (unlike the notarization key which cannot be changed after it is certified by the manufacturer). There could, in fact, be several different user private keys.

In accordance with the fourth embodiment, the operation depicted in FIG. 3 must be modified such that the operations of block 42 actually result in communications, through appropriate ports with the user's private key token. In this mode, the processing shown in the box does not all occur within the personal notarization device (1)—however the output of box 42 again (as in the third mode) is a digital signature by the user's private key of the material to be signed. The output value from box 42 then becomes "value to be notarized" 42.

The combined resulting value is then signed with the notarization private key (which has been generated and certified at the factory). The combined resulting value after being signed is output to output port 56. In step 58, the necessary certificates for both public keys (the user's and the device's) are incorporated into the final proof packet result.

In a further possible alternative embodiment, a smart card trusted clock device is implemented to allow a personal smart card-type device to incorporate trusted date/time notarization into a single resulting digital signature without requiring a trusted clock to reside in the smart card itself. This allows a more limited (clockless device) to provide the same signature result (incorporating a trusted time stamp into a single personal digital signature as in the FIG. 3 embodiment), but without a trusted clock on board the smart card-type device. In order to accomplish this end, the smart card is coupled with a date/time notary facility but using a different protocol than is used in the mode described above using a smart diskette as described in aforementioned German published patent document.

Although the trusted clock signature is only available when used with the trusted notary device, this may be acceptable for certain applications. The trusted clock digital notary facility could be incorporated into a smart card reader device so that interaction between the smart card and the reader device could result in a date/time, notarized digital signature similar to, or identical with, that produced by the alternative embodiments described above.

Figure 4:
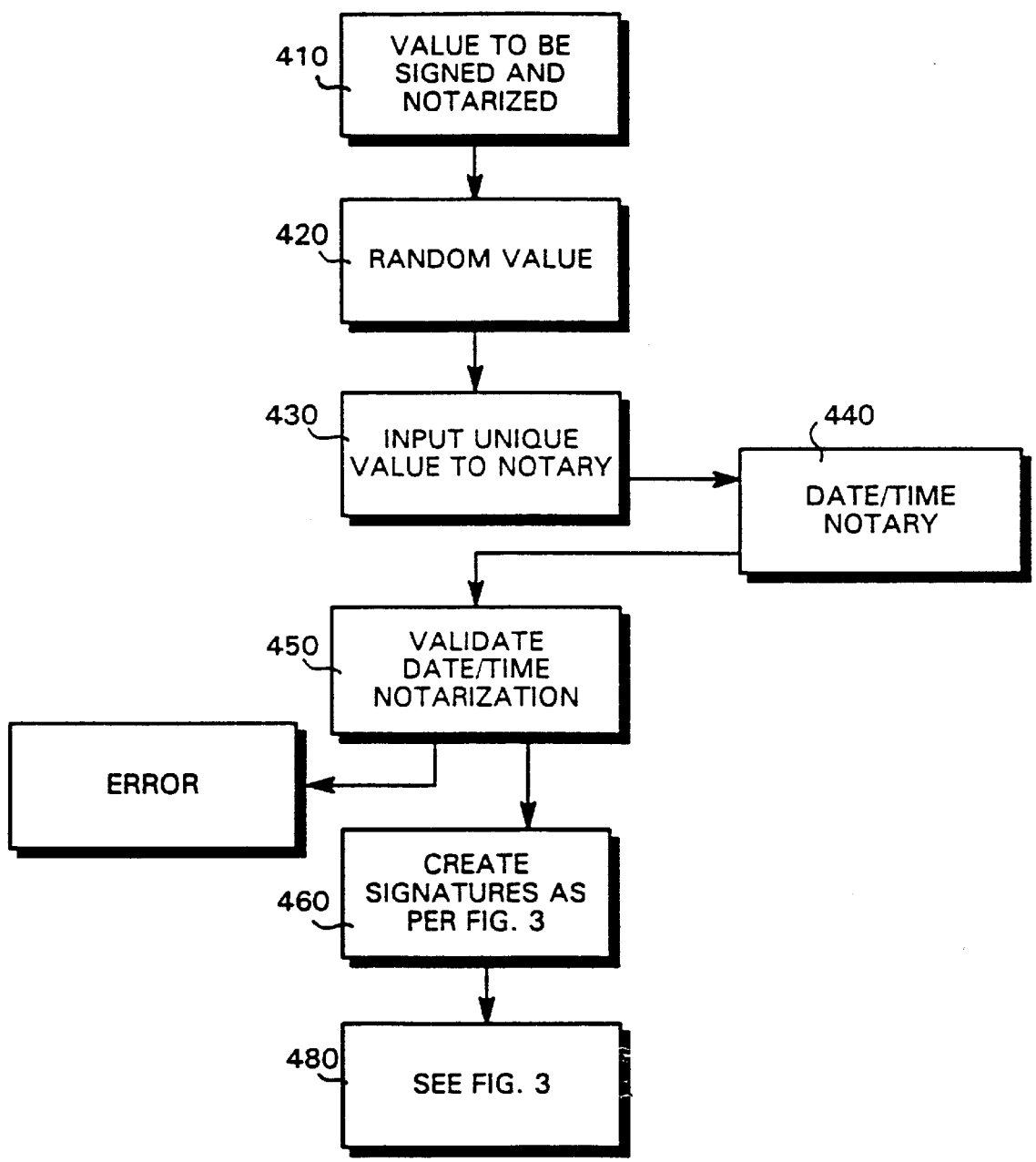
FIG. 4 is a flow diagram showing how the personal notary device may be operated in accordance with a further embodiment of the present invention.

FIG. 4 depicts operation in accordance with this alternative embodiment and demonstrates how this embodiment may be incorporated into the methodology described in FIG. 3. Step 48 of FIG. 4 and step 48 of FIG. 3 depict identical operations. Further operation then proceeds as previously described in conjunction with FIG. 3.

As shown in FIG. 4, the smart card is given a value 410 to be digitally signed and date/time notarized. In accordance with block 420, the smart card produces a unique value and presents this value to the trusted date/time notary device. This is designed to prevent attack by an opponent attempting somehow to insinuate ("playback") a stale date/time value into the communication. The unique value may optionally be generated by an on-board random value generator or may be based on the value to be signed.

In accordance with step 430, the unique value is presented by the trusted date/time notary facility which is coupled to the smart card reader or is incorporated into it. In accordance with step 440, the trusted date/time device notarizes the offered unique value by signing in conjunction with the current time and returns it to the smart card. It is preferred that the trusted date/time device will also return the certificate (or a certificate hierarchy). This certificate, typically produced by the notary facility's manufacturer, serves to prove to the smart card that this time stamp is accurate and trustworthy.

In accordance with block 450, on receipt of this signed value, the smart card then validates that the resulting notarization was performed on its unique value as provided in step 420 above. The smart card additionally validates that the certificates provided with the notarized value accurately describes the notarizing signature and that the certificates contain sufficient information to allow the smart card to determine that the signature was, in fact, produced by a trusted notary device. Ultimately this information is validated based on root information loaded into the smart card when it was manufactured. Such root information may include, for example, a root certificate by the notary manufacturer or its public key (or some hash thereof). Presuming that the certificates provided by the notary device were signed by an authority recognized according to information stored within the smart card (such as the public keys in the notary facility device or the pubic keys of the manufacturer of the notary device, or the hashes thereof), the smart card is assured that it has a current trustworthy clock value. As part of the verification, the smart card ensures that the notarized value is derived from the unique value which is initially provided in step 420.

In accordance with step 460, the smart card then uses the date/time provided by the notary device with effectively the same level of trust as if the trusted date/time notary device resided within itself. Thus, the trusted date/time can be incorporated into the signature operation done with the user's public key. The smart card can be used with other applications (or with readers not coupled to a trusted date/time notary) except that signatures created would not be bound with a date/time notarization. Thereafter, signatures are created in accordance with the embodiment shown in FIG. 3 and operation proceeds with step 48 shown therein.

As a further alternative embodiment, the smart card type device may apply the user's private key first, then present that signature as data to a coupled smart card interface/time stamp notary device in which the user's signature and the time stamp notarization signature retain their separate identities. In this case, the coupling of the time/notary device and smart card reader (interface) provide for convenient time notarization of the user's signature in a format consistent with other uses of the date/time notary such as that outlined in applicant's U.S. Pat. Nos. 5,011,752 or 5,163,643. Although the preferred embodiments of the various modes always supply a time stamp, it is contemplated that an implementation may be created in which the time stamp may be conditionally supplied.

Figure 5:
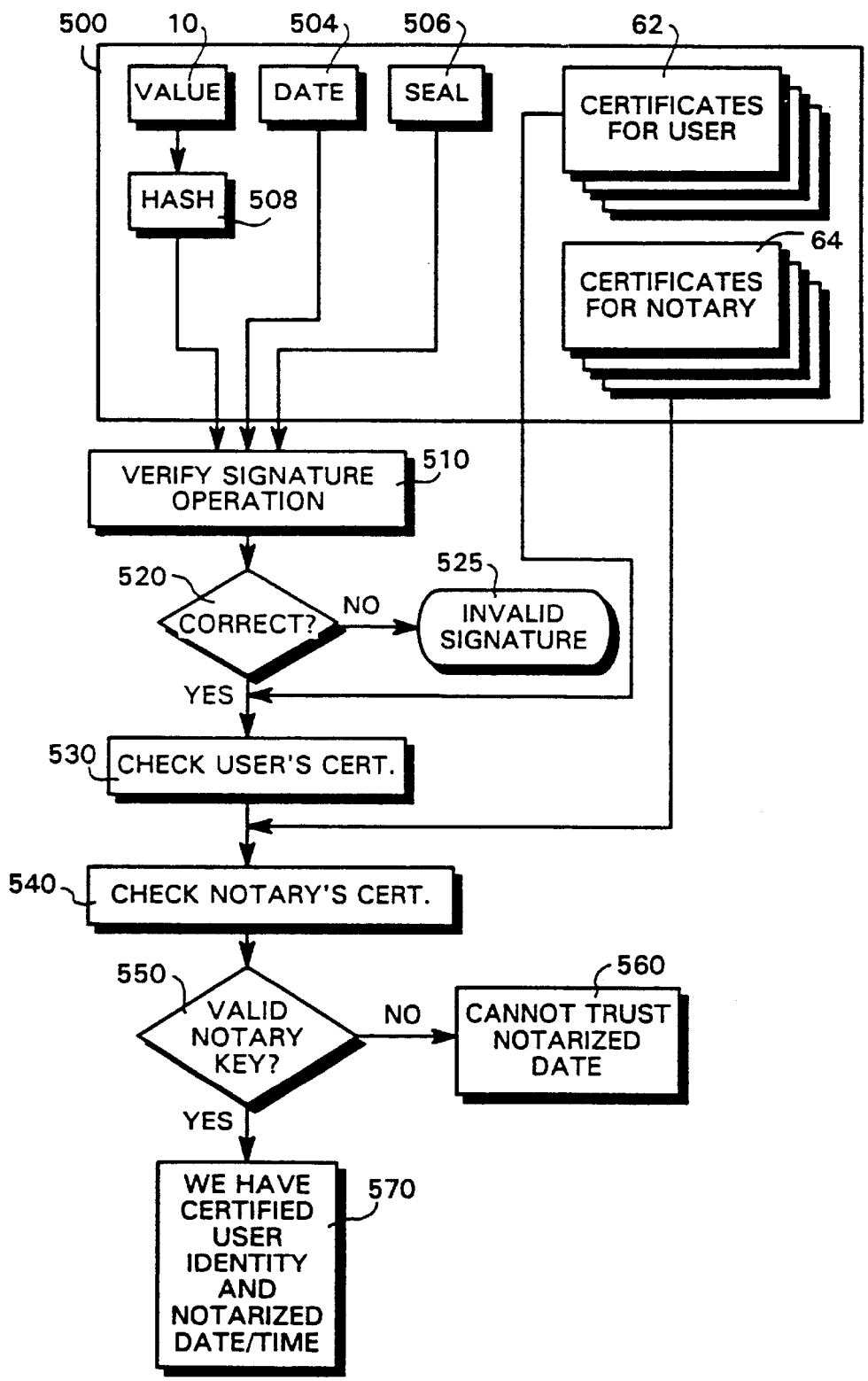
FIG. 5 is a flowchart showing how a proof set generated by the notary device of the present invention may be verified.

FIG. 5 is flow diagram showing how an exemplary proof set 500 may be verified. The verification operation requires no special security measures be undertaken. A recipient who receives material which has been signed, verifies the signature as described below.

The recipient receives a proof set 500 including the value 10 of the object, i.e, a digital document together with a signature produced by the notary device of the present invention which includes: the hash of the value of the signed object 508, the date/time 504 as purportedly produced by a trusted notary device (which is proven in later verification steps), and the seal 506 produced by applying the private key which resides in the device operated by the user to the above information. Additionally, the proof set will include certificates 62 and 64 which prove that the public key (counterpart to the private key stored in the device) belongs to the user, and is operated in conjunction with a trusted date/time notary.

The entity which verifies the signature performs the following steps. The signature operation is verified to show that it correctly reflects the data which was signed and that it was correctly composed with the "purported" date/time. A hash of the value 10 (output 508), the date 504 and the seal 506 are input to verify the signature operation at 510. If the seal does correctly reflect the date 506 (as determined at 510), a determination is made in block 520 if an invalid signature is detected. If so, an "invalid signature" message 525 is conveyed to the recipient. If the seal 506 does correctly reflect the data, then processing continues at block 530. As indicated in block 530, the user's certificate is checked to confirm that the identity of a signer was appropriately associated with the signer's public key. The invention contemplates additionally verifying the authority possessed by the user if desired, in accordance with the applicant's enhanced digital signature related methodology described in U.S. Pat. No. 5,005,200.

In accordance with step 540, confirmation is made using whatever certificates (or other information) are available that the public key is also associated with and operated from the expected type of trusted date/notary device based on the contents of certificates 64 (which may be the same as the certificate for the user 62 in accordance with the first embodiment of the present invention). It should be appreciated that the precise verification steps will vary depending upon which of the above-described embodiments is being utilized.

In accordance with step 550, a check is made to determine whether the notary key is valid and is certified as belonging to a trusted date/time notary device. If the notary key is not valid, then a message is generated that the recipient cannot trust the notary and date. Alternatively if a valid notary key is detected, then as indicated in block 570, confirmation is made of the identity of the user and the notarized date and time.

In the above described embodiments where multiple signatures are performed using the private notarization key and the user's private key, verification is similar to what is described above in conjunction with FIG. 5, except that multiple verifications performed by different public keys are used in verifying the multiple signatures.

When a Personal Identification Number (PIN) password is used in conjunction with the above-described embodiments, it could be presented to the token device in several ways including, for example, 1) with the signature request; 2) encrypted under a public key associated with the token device; 3) encrypted under a secret key shared with the token device; 4) used as encryption key, or to derive an encryption key, for signing or transmitting information to and/or from the token device.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An intelligent media reader system for coupling a user's intelligent media to a computer comprising:
   a media interface port for receiving a digital value from said media;
   a source providing digital information indicative of at least one of date and time;
   a storage device for storing a private key, wherein said private key is used in performing digital signature operations;
   a communication port operatively coupled in use to transfer information to a computer; and
   an intelligent reader processing device coupled to said media interface port, said communication port, and said source providing digital information, for receiving said digital value and said information indicative of at least one of date and time and for performing at least one digital signature operation with said private key for output to said communication port.

2. An intelligent media reader according to claim 1, wherein said intelligent media includes a processor for performing at least digital signature operations, and a secure storage device for storing a user's private key, and wherein said digital value received by said intelligent media interface port is an intelligent media based digital signature.

3. An intelligent media reader according to claim 2, wherein said intelligent media reader processing device operable to digitally sign said intelligent media based digital signature using an intelligent media reader private key and to transfer a time notarized digital signature to the user's computer.

4. An intelligent media according to claim 1, wherein said intelligent media reader processing device is operable to transfer said digital signature to said intelligent media.

5. An intelligent media reader according to claim 1, wherein said intelligent media reader includes a memory having locations for storing data indicative of a digital certificate associated with said intelligent media reader.

6. An intelligent media reader according to claim 1, wherein said intelligent media reader processing device is operable to validate a user's personal identification password (PIN) as a prerequisite to providing the digital signature.

7. An intelligent media reader according to claim 1, wherein said source providing digital information indicative of at least one of date and time is a clock embodied in said reader.

* * * * *